(12) United States Patent
Kumar et al.

(10) Patent No.: US 7,190,124 B2
(45) Date of Patent: Mar. 13, 2007

(54) TWO-WIRE DIMMER WITH POWER SUPPLY AND LOAD PROTECTION CIRCUIT IN THE EVENT OF SWITCH FAILURE

(75) Inventors: Russikesh Kumar, Bethlehem, PA (US); Stuart DeJonge, Riegelsville, PA (US); David J. Dolan, Center Valley, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 109 days.

(21) Appl. No.: 11/129,793

(22) Filed: May 16, 2005

(65) Prior Publication Data

US 2006/0255746 A1    Nov. 16, 2006

(51) Int. Cl.
*H05B 37/02* (2006.01)

(52) U.S. Cl. .................. 315/224; 315/240; 315/241 R; 315/242

(58) Field of Classification Search ................ 315/224, 315/240, 241 R, 242
See application file for complete search history.

(56) References Cited

U.S. PATENT DOCUMENTS

| | | | |
|---|---|---|---|
| 3,646,423 A * | 2/1972 | Tatematsu et al. ............ | 363/54 |
| 5,239,255 A | 8/1993 | Schanin et al. ............. | 323/300 |
| 5,363,020 A * | 11/1994 | Chen et al. ............. | 315/209 R |
| 6,646,843 B1 | 11/2003 | Newman, Jr. et al. ........ | 361/65 |

FOREIGN PATENT DOCUMENTS

| | | |
|---|---|---|
| DE | 44 41 733 B1 | 11/1994 |
| DE | 297 02 524 | 8/1997 |
| EP | 0 923 274 | 4/2002 |
| EP | 0 889 673 | 6/2004 |
| GB | 2 297 439 | 7/1996 |
| GB | 2 297 441 | 7/1996 |
| GB | 2 348 551 | 10/2000 |
| GB | 2 349 959 | 11/2000 |
| WO | WO 91/19339 | 12/1991 |
| WO | WO 91/19340 | 12/1991 |
| WO | WO 91/19341 | 12/1991 |
| WO | WO 92/15052 | 9/1992 |

(Continued)

*Primary Examiner*—David Vu
(74) *Attorney, Agent, or Firm*—Osterlenk, Faber, Gerb & Soffen, LLP

(57) ABSTRACT

A dimmer circuit provides AC power to an inductive lighting load in series with the dimmer circuit. A bidirectional semiconductor switch has a control electrode with a control signal for determining the power provided to the load. The switch in normal operation is controlled to block voltage in first and second half-cycles of the AC voltage. In a failure mode it can block the AC voltage in only one half-cycle. A controller for the switch determines the failure mode of the switch occurs which can cause an asymmetry between the half-cycles and thus a DC voltage component. A power supply supplies power to the controller from across the dimmer circuit. The controller drives the switch into substantially full conduction during most of the half-cycle which the switch is able to control; and drive the switch into non-conduction for a period of time during that same half-cycle so as to reduce the DC voltage component to prevent excessive transformer heating. The power supply is provided with sufficient voltage from the AC voltage to enable the controller to continue to operate.

43 Claims, 13 Drawing Sheets

FOREIGN PATENT DOCUMENTS

| WO | WO 92/20130 | 11/1992 |
| WO | WO 93/21753 | 11/1993 |
| WO | WO 02/15648 | 2/2002 |
| WO | WO 03/081364 | 10/2003 |
| WO | WO 03/081962 | 10/2003 |

* cited by examiner

US 7,190,124 B2

TWO-WIRE DIMMER WITH POWER SUPPLY AND LOAD PROTECTION CIRCUIT IN THE EVENT OF SWITCH FAILURE

BACKGROUND OF THE INVENTION

The present invention relates to power supply circuits, and more particularly, to power supply circuits for supplying power to alternating-current (AC) loads, for example lighting dimmer circuits, and wherein the circuit employs a power supply for providing power to a control circuit controlling a switching circuit supplying power to the load and which protects the load in the event of switch failure.

Circuits for providing variable power to AC loads are known, for example, lighting dimmers. Some lighting loads are low-voltage lighting loads, which are supplied with AC power via a step-down transformer, typically an isolation transformer. These step-down transformers step the voltage down to the low-voltage level, for example 12 to 24 volts, necessary to power the lamp or lamps. A problem with low-voltage lighting loads employing a transformer, such as magnetic low-voltage (MLV) lighting, is that the transformers are susceptible to any direct-current (DC) components of the voltage across the transformer. A DC component in the voltage across the transformer can cause the transformer to generate acoustic noise and to saturate, increasing the temperature of the transformer and possibly creating a fire hazard.

In many countries, there are requirements that such magnetic low-voltage lighting loads incorporate thermal protection to protect against overheating. For example, some magnetic low-voltage lighting loads employ thermal sensors or fuses that trip in the event of an over-current condition to prevent overheating and fire hazards. However, this is not a universal requirement for magnetic low-voltage lighting loads, and accordingly, it is important to ensure that such magnetic low-voltage lighting loads, particularly where the loads are not thermally protected, are prevented from overheating.

Dimmer circuits utilize semiconductor switches, such as triac and field effect transistors (FETs), to control the power supplied to the lighting load. Since a triac is bidirectional device, if the triac fails shorted, current will flow in both half-cycles and no substantial DC component will be supplied to the load. Thus, the problem of overheating an MLV transformer due to a DC component of the voltage is not created. The end user of the dimmer will know that there is a problem with the dimmer because the connected lighting load will be on at full brightness and the user will not be able to dim the light. Of course, if the dimmer switch fails open there is no overheating problem as the load will not be supplied with power.

A problem does arise, however, with dimmers that employ FETs as the controlled switching devices. Individual FETs are not bidirectional switches, so generally two FETs are employed in an anti-serial connection, i.e., they are connected in series such that the sources of the two transistors are connected together such that they function as a bidirectional switch. FETs are often used in dimmers because they provide better EMI (electromagnetic interference) performance and more flexible control of the current through the load. In dimmer circuits employing FETs, power will flow through both transistors to the lamp load. In particular, in one half-cycle of the AC source current, the power will flow through the drain-source path of a first transistor (with the gate being appropriately controlled to provide the desired dimming level) and through the body diode and/or anti-parallel connected external diode connected across the second transistor. In the other half-cycle, the current will flow from the second transistor's source to the drain (with the gate controlled to provide the desired dimming) and through the body diode of the first transistor and/or the anti-parallel connected external diode.

If both of the series-connected FETs fail shorted, the situation is the same as when the triac fails shorted. The lamp load will be at full brightness and there will be no dimming and because both half-cycles are passed substantially completely, the lamp load will be at substantially full brightness. In two-wire dimmers (i.e., dimmers without a neutral connection), typically a small portion of the AC power is removed from the AC line source to power the dimmer control circuitry by obtaining power across the dimmer when the switches are off, i.e., during the phase cut portion of the power provided to the lamp load or before the switches conduct. This is because there is no neutral connection to the dimmer. With both the switches shorted, the control circuitry for the switches will not be provided with power. However, there is no overheating hazard because there is no DC component provided to the magnetic low-voltage lamp load, since both half-cycles are passed substantially equally.

If both the FETs fail open, no power is provided to the load and there is no overheating hazard.

The problem of overheating an MLV transformer occurs when only one of the FETs fails. In such case, should one FET fail shorted, the shorted FET will provide power to the load during the complete half-cycle. In absence of the failure, the FET normally would be able to control the power delivered to the load during the half-cycle. When one FET is shorted, the diode of the other FET will conduct since it is forward biased. The other FET will be controlled by the dimmer control circuit such that it provides a phase cut dimming signal during its half-cycle of conduction; and of course, the shorted switch will also conduct. Due to the asymmetry between the two half-cycles, a DC component will be provided to the load, thus creating an overheating hazard. If no thermal protection is provided, a potential fire hazard exists.

Should one of the switches fail open, there may be an asymmetry if the open failure leaves the body diode (or external diode) intact because in that case one half-cycle will be absent whereas the other half-cycle will be present, also causing an overheating hazard. If the open failure results in both the drain-source path and the body diode (or external diode) of one switch being open, no power can be provided to the load and there is no overheating hazard.

There is a need for a protection circuit in such dimmers to prevent the described overheating hazard due to the DC component in the case of switch failure, particularly in the case of magnetic low-voltage lamp loads, which at the same time ensures that even in the event of such a failure, power is provided to the power supply control circuit for the dimmer to enable the control circuitry of the dimmer to continue to operate in a manner so as to reduce or eliminate the DC component.

SUMMARY OF THE INVENTION

The present invention provides a dimmer circuit for providing AC power from an AC voltage source to an inductive lighting load disposed in series with the dimmer circuit comprising a bidirectional semiconductor switch having at least one control electrode provided with a control signal for controlling the amount of power provided to the load, the switch in normal operation being able to be controlled to block voltage in first and second opposite polarity half-cycles of the AC voltage source but in a failure mode being able to block voltage in only one half-cycle of the AC voltage source and not being able to block voltage in the second opposite polarity half-cycle; a controller for the switch for determining if said failure mode of the switch occurs; a power supply for supplying power to the controller and provided with power across the dimmer circuit; the controller controlling the switch if such failure mode occurs so as to: drive the switch into substantially full conduction during most of the half-cycle which the switch is able to control; and drive the switch into non-conduction for a brief interval of time during that same half-cycle so as to prevent a DC voltage component supplied to the load from exceeding a predetermined level below which excessive transformer heating does not occur, thereby minimizing overheating of the inductive load and enabling the power supply for the controller to be provided with sufficient voltage from the AC voltage source to enable the controller to continue to operate.

According to the present invention, where the bidirectional switch comprises two anti-series connected FETs, and one of the switches has failed, the controller of the dimmer circuit drives the non-failing switch into full conduction during most of the half-cycle which the switch is able to control and drives the switch into non-conduction for only a brief period of time during that half-cycle so as to prevent the DC voltage level being supplied to the attached load from exceeding a predetermined level, below which level excessive transformer overheating does not occur, and enables the power supply to be provided with sufficient voltage to enable the controller to continue to operate. In this way, the controller can continue to operate and can provide a fault signal indicating that a fault has occurred in the dimmer, for example, blinking a indicator on a user interface of the dimmer. Further, there is no danger that the magnetic low-voltage lamp load will overheat excessively to a point that it presents a hazard because the DC level is maintained below the predetermined level. Thus, the circuit according to the present invention protects the load from damage as well as protecting the dimmer circuit itself from further damage and enables the controller of the dimmer circuit to continue to operate.

The present invention also provides a method for operating a dimmer circuit for providing AC power from an AC voltage source to an inductive lighting load disposed in series with the dimmer circuit, wherein the dimmer comprises a bidirectional semiconductor switch having at least one control electrode provided with a control signal for controlling the amount of power provided to the load, the switch in normal operation being able to be controlled to block voltage in first and second opposite polarity half-cycles of the AC voltage source but in a failure mode being able to block voltage in only one half-cycle of the AC voltage source and not being able to block voltage in the second opposite polarity half-cycle; a controller for the switch for determining if said failure mode of the switch occurs which can cause an asymmetry between the half-cycles delivered to the load and thus a DC voltage component to be delivered to the load; a power supply for supplying power to the controller and provided with power across the dimmer circuit; the method comprising driving the switch into substantially full conduction during most of the half-cycle which the switch is able to control; and driving the switch into non-conduction for a brief interval of time during that same half-cycle so as to prevent a DC voltage component supplied to the load from exceeding a predetermined level below which excessive transformer heating does not occur, thereby minimizing overheating of the inductive load and enabling the power supply for the controller to be provided with sufficient voltage from the AC voltage source to enable the controller to continue to operate.

The present invention further provides a method for operating a dimmer circuit for providing AC power from an AC voltage source to an inductive lighting load disposed in series with the dimmer circuit, wherein the dimmer circuit comprises a bidirectional semiconductor switch having at least one control electrode provided with a control signal for controlling the amount of power provided to the load, the switch in normal operation being able to be controlled to block voltage in first and second opposite polarity half-cycles of the AC voltage source but in a failure mode being able to block voltage in only one half-cycle of the AC voltage source and not being able to block voltage in the second opposite polarity half-cycle; a power supply for supplying power to a control circuit for the dimmer circuit and provided with power across the dimmer circuit; the method comprising determining if said failure mode of the switch occurs which can cause an asymmetry between the half-cycles delivered to the load and thus a DC voltage component to be delivered to the load; driving the switch into substantially full conduction during most of the half-cycle which the switch is able to control; and driving the switch into non-conduction for a brief interval of time during that same half-cycle so as to prevent a DC voltage component supplied to the load from exceeding a predetermined level below which excessive transformer heating does not occur, thereby minimizing overheating of the inductive load and enabling the power supply for the control circuit to be provided with sufficient voltage from the AC voltage source to enable the control circuit to continue to operate.

Other objects, features and advantages of the present invention will become apparent from the following detailed description.

BRIEF DESCRIPTION OF THE DRAWINGS

The invention will now be described in greater detail in the following detailed description with reference to the drawings in which.

DETAILED DESCRIPTION OF PREFERRED EMBODIMENTS OF THE INVENTION

Figure 1:
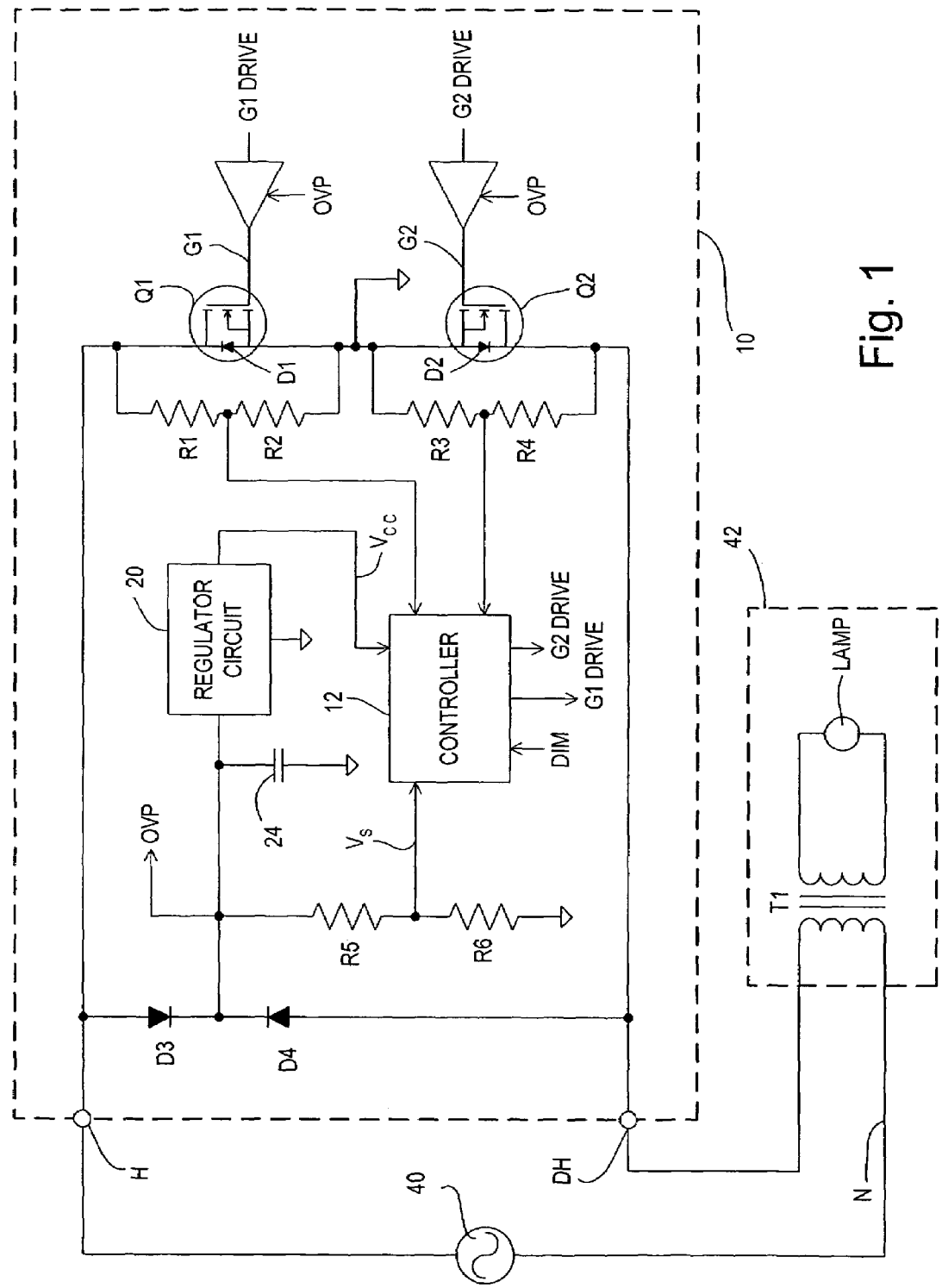
FIG. 1 shows a simplified schematic diagram of a dimmer circuit employing the principles of the present invention.

With reference now to the drawings, FIG. 1 shows a simplified schematic diagram of a dimmer 10 incorporating the principles of the present invention. The dimmer 10 includes first and second semiconductor switches Q1 and Q2 functioning as a bidirectional switch. The switches may be FETs connected in anti-series relationship. The intrinsic body diodes D1 and D2 are shown. Additionally, external diodes can be provided across each of the transistors Q1 and Q2 connected in the same way as the body diode, as shown, to provide a better forward voltage characteristic than the body diode. The two transistors Q1 and Q2 have their gates G1 and G2 controlled by a controller 12, such as a microprocessor, in response to a dimming signal DIM and other inputs (such as on/off) from the user interface (not shown) of the dimmer 10, to provide appropriate dimming and on/off control. Although a microprocessor controller 12 is shown, this circuit need not have a microprocessor and can be an analog or digital control circuit. The transistors Q1 and Q2 are connected between the Hot (H) terminal and the dimmed hot (DH) terminal. The H terminal is connected to an AC power supply 40. The DH terminal is connected to the MLV lamp load 42 (comprising step down transformer T1 and the lamp or lamps), which is also connected to the neutral (N) terminal, completing the load circuit.

Connected across each of the transistors Q1 and Q2 is a respective voltage divider comprising resistors R1, R2 and R3, R4. The purpose of these voltage dividers is to sense the voltage present across respective switches Q1 and Q2 to control switching and to sense failure of either of the FETs. If a transistor fails shorted, the output of the voltage divider will be substantially zero. If a transistor fails open, the voltage across the divider will be determined by the current through the resistances and/or body/external diode and will be some non-zero level.

Further, a power supply is provided for generating a DC output voltage to power the controller 12. The power supply comprises diodes D3 and D4, an input storage capacitor 24, and regulator circuit 20, which may be any suitable regulator circuit, for example, a switching mode power supply (SMPS), such as a buck converter. The power supply is supplied with an input voltage from the AC line and provides a supply voltage $V_{CC}$ to the controller 12. Since the dimmer 10 is a two-wire dimmer and the neutral connection is not present in the dimmer, a small amount of current must be drawn from the AC line through the load to charge an input storage capacitor 24, preferably without causing the lighting load to light. During normal operation, a small amount of power is drawn from the AC line when the FETs Q1 and Q2 are non-conducting and a voltage is developed across the dimmer 10. The power supply draws current during the positive half-cycle through the rectifier diode D3 and during the negative half-cycle through the rectifier diode D4 to charge input supply capacitor 24. The regulator circuit 20 then converts the voltage on the input storage capacitor 24 to the required output voltage $V_{CC}$ to power the controller 12.

Another voltage divider comprising resistors R5 and R6 is provided from the input of the regulator circuit 20 to circuit common to produce a sense voltage $V_S$, which is provided to the controller 12. An over voltage protection circuit (OVP) is provided to detect a line over-voltage condition. If an over-voltage on the AC line is detected, in order to protect the dimmer circuit, both FETs are turned fully on to prevent the input storage capacitor 24 from overcharging and the FETs from being damaged due to the over-voltage condition.

As discussed above, during normal operation, the controller 12 will operate the switches Q1 and Q2 such that during the positive half-cycle, transistor Q1 will be turned on with conduction across transistor Q2 through the body diode and/or external diode D2, thus supplying power to the lamp load during a portion of the positive half-cycle. During the negative half-cycle, transistor Q2 will be turned on with conduction across Q1 through the body diode and/or external diode D1, thus supplying power to the load during a portion of the negative half-cycle. Controller 12 is provided with a dimming input (DIM) from the user interface of dimmer 10 (not shown). The controller 12 uses this DIM input to control the signals to the gates G1 and G2, and thus, to control the amount of phase angle delay before the transistors Q1 and Q2 conduct during each half-cycle, as well known to those of skill in the art. During normal operation, the two switches Q1 and Q2 are controlled such that in the positive and negative half-cycles, approximately equal power is delivered to the load in each half-cycle. There is substantially no DC component of the voltage across the transformer load and the transformer load is not saturated and thus not overheated.

Figure 2A:
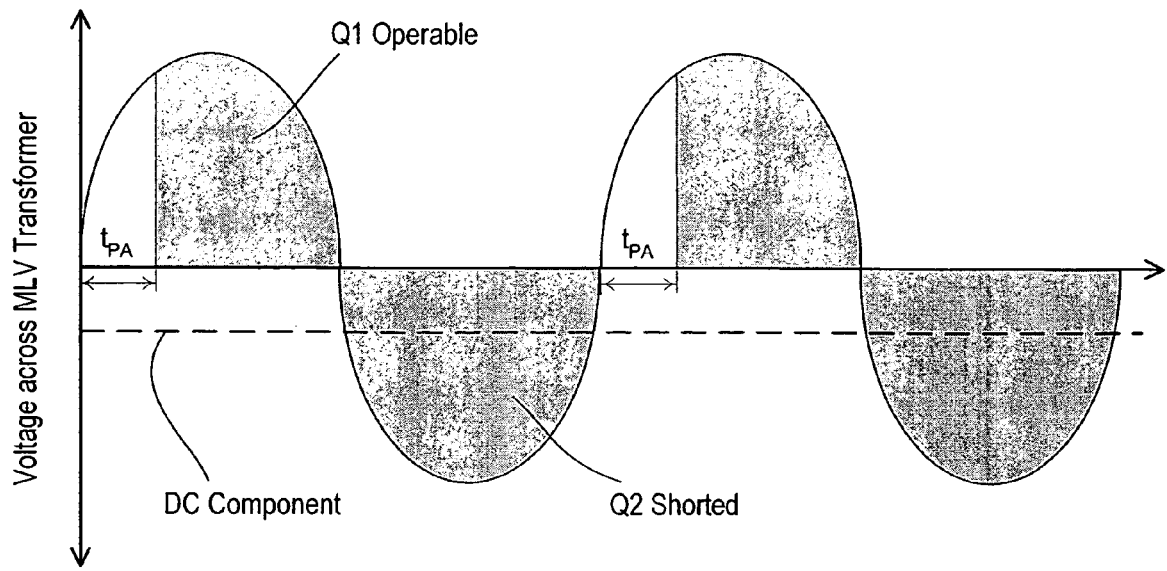
FIG. 2A shows an example of an asymmetric waveform provided to the load in the event of a shorted switch and which has a DC component.
Figure 2B:
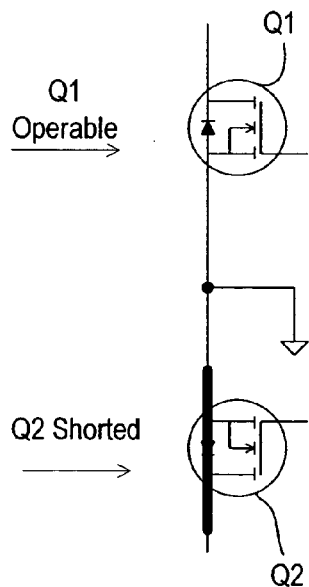
FIG. 2B shows an example the event of a shorted switch.

In the instance where only one of the transistors Q1 and Q2 fails shorted, the voltage waveforms supplied to the transformer primary of the magnetic low-voltage lamp load will be asymmetrical in the positive and negative half-cycles, thus providing a DC voltage level to the load, which can cause saturation and overheating. For example, if FET Q2 is shorted as shown in FIG. 2B, FET Q2 will conduct the entire AC current in both half-cycles. During the positive half-cycle, FET Q1, which is operating normally, will conduct for only a portion of the half-cycle. During the negative half-cycle, current will flow through the shorted FET Q2 and through the body diode D1 of FET Q1 throughout the duration of the half-cycle. The asymmetry in the overall voltage waveform provided to the lamp load produces a negative DC component in the voltage as shown in FIG. 2A. Depending on the amount of asymmetry, this may cause substantial saturation and overheating of the transformer core.

In the event of an open switch failure where the body diode or external diode is intact, an asymmetry will also result between the half-cycles which will be even greater since one half-cycle will be completely absent.

According to the present invention, the controller 12 of the dimmer 10 drives the non-failing switch into full conduction during most of the half-cycle which the switch is able to control and drives the switch into non-conduction for only a brief period of time during that half-cycle so as to prevent the DC voltage level being supplied to the attached load from exceeding a predetermined level, below which level excessive transformer overheating does not occur, and enables the power supply to be provided with sufficient voltage to enable the controller to continue to operate. In this way, the controller can continue to operate and can provide a fault signal indicating that a fault has occurred in the dimmer. Further, there is no danger that the magnetic low-voltage lamp load will overheat excessively to a point that it presents a hazard because the DC level is maintained below the predetermined level. Thus, the circuit according to the present invention protects the load from damage as well as protects the dimmer circuit itself from further damage and enables the controller of the dimmer circuit to continue to operate.

According to one aspect of the invention, the controller 12 is provided with the sense signal $V_S$ from the voltage divider comprising resistors R5 and R6. If the voltage across capacitor 24 goes below a predetermined level, the controller 12 turns the non-faulty switch off briefly during the half-cycle in which the switch can control, thereby providing a voltage level briefly across the terminals H and DH which will enable capacitor 24 to charge. Thus, the power supply will be provided with a brief burst of power to allow capacitor 12 to recharge so that the power supply can continue to provide power to the controller 12.

Figure 3:
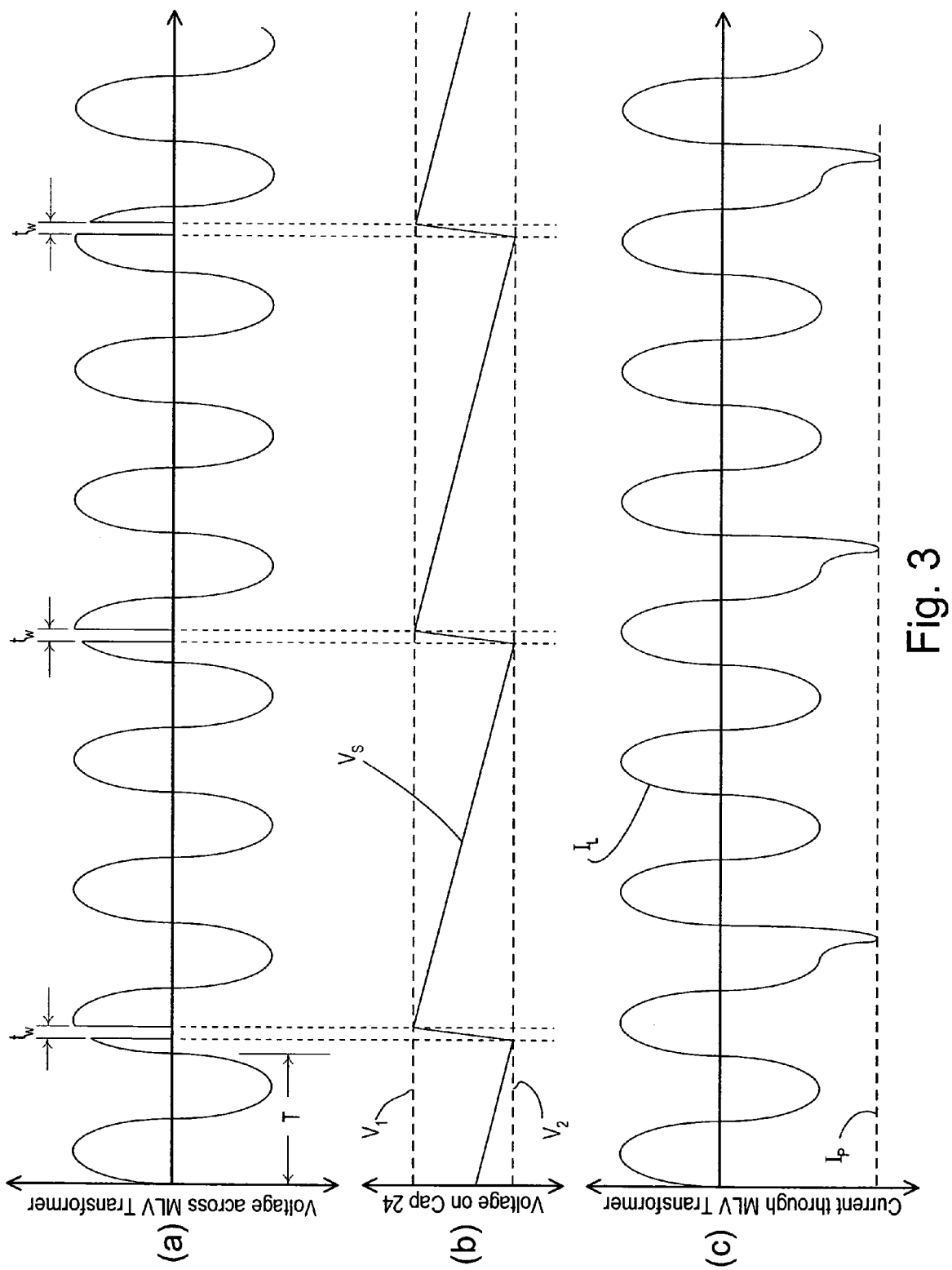
FIG. 3 shows waveforms in the circuit of FIG. 1 of the present invention.

FIG. 3 shows waveforms present in the circuit of FIG. 1 according to the present invention. With regard to all waveforms shown in FIG. 3, it has been assumed that the transistor Q2, that is, the transistor that would normally be able to control the negative half-cycle, has failed in a shorted condition. In FIG. 3(*a*), the waveform shows the voltage across the magnetic low-voltage lamp load $V_{DH}$ and, in particular, across the primary winding of the MLV transformer. Note that the full negative half-cycle is passed through the load. The transistor Q1 has not failed, and is able to be controlled by the controller 12. The controller 12 determines that transistor Q2 has failed by monitoring the voltage across the voltage divider comprising resistors R3 and R4.

If transistor Q2 has failed shorted, the output of the voltage divider comprising resistors R3 and R4 will be substantially zero during both positive and negative half-cycles. Thus, the controller 12 determines that the FET Q2 has either failed in a shorted condition (or the FET has been switched on by other protection hardware, for example over-voltage protection circuitry OVP). The processor 12 will need to determine what has occurred. If the OVP protection circuit is not on, then a determination is made that the FET is shorted. During normal operation, when the FET is off (and the half-cycle is being passed by the body diode of the FET and the other transistor), the voltage across the FET should be approximately one diode voltage drop due to the anti-parallel connected diode, i.e., the internal body diode or externally connected diode. If the switch is shorted, however, the voltage across the switch will be substantially less than this, nearly zero.

FIG. 3(*b*) shows the voltage $V_S$ at the output of the voltage divider comprising the resistors R5 and R6, i.e., the voltage across the input storage capacitor 24. When the voltage across capacitor 24 is between V1 and V2 and switch Q2 has failed, the controller 12 will drive the switch Q1 into substantially full conduction as shown in FIG. 3(*a*). However, when the voltage across capacitor 24 drops to a predetermined threshold $V_2$, the controller 12 will turn off the non-failing switch Q1 for a brief period of time, $t_w$, for example, approximately one millisecond, thereby briefly removing power from the load and allowing the capacitor 24 to be recharged, as shown in FIG. 3(*b*) during the brief interval $t_w$. The predetermined threshold $V_2$ is close to but above a level which would not allow the power supply to provide an adequate voltage to power controller 12. Once the voltage across capacitor 24 reaches the level $V_1$, the controller 12 will turn on the non-failing switch Q1 again to supply power to the load. As shown in FIG. 3(*a*), the cycle will repeat. When the voltage across the storage capacitor 24 again drops to voltage level $V_2$, the non-failing transistor will be turned off again briefly to allow the storage capacitor 24 to charge.

The current $I_L$ in the transformer load is shown in FIG. 3(*c*). After the brief period of non-conduction of the non-failing switch Q1, the current $I_L$ peaks up to a peak current value $I_P$. However, due to the protective circuit of the invention, the peak current allows only a brief period of transformer saturation and thus, does not overheat the transformer.

Figure 4:
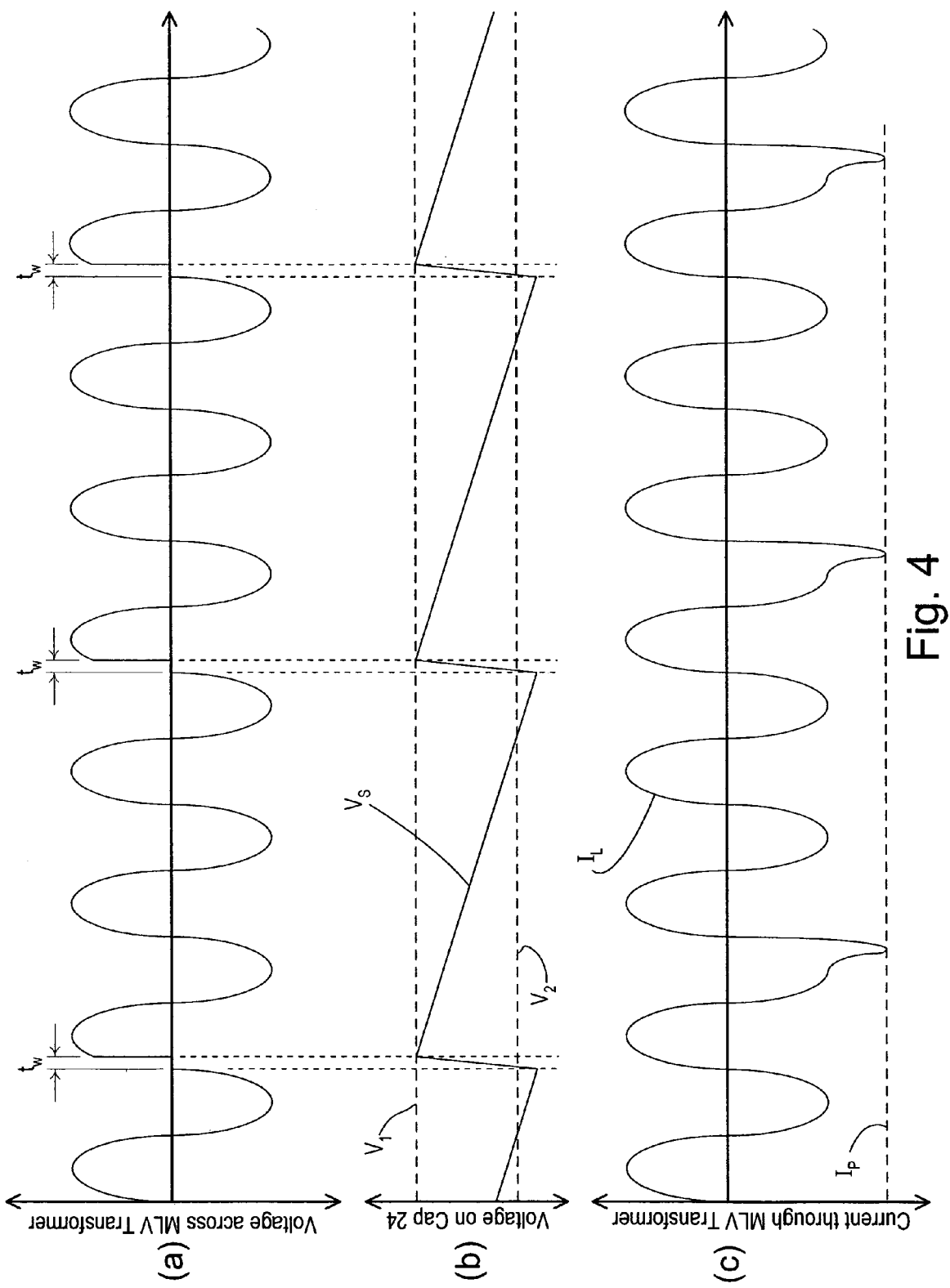
FIG. 4 shows waveforms in the circuit of FIG. 1 of the present invention with the brief interval of time beginning at a zero-crossing of the AC voltage supply.

FIG. 4 shows waveforms present in the circuit of FIG. 1 according to the present invention where the brief interval of time $t_w$ begins at a zero-crossing of the AC power source. A zero-crossing is defined as the time at which the AC voltage source equals zero at the beginning of each half-cycle. The brief interval of time $t_w$ will occur after the voltage $V_S$ drops below the level $V_2$ in the next half-cycle in which the controller 12 is able to control the non-failing FET. Once the voltage across capacitor 24 reaches the level $V_1$, the controller 12 will turn on the non-failing switch Q1 again to supply power to the load. Alternatively, the brief interval of time $t_w$ could end at a zero-crossing of the AC power source.

Figure 5:
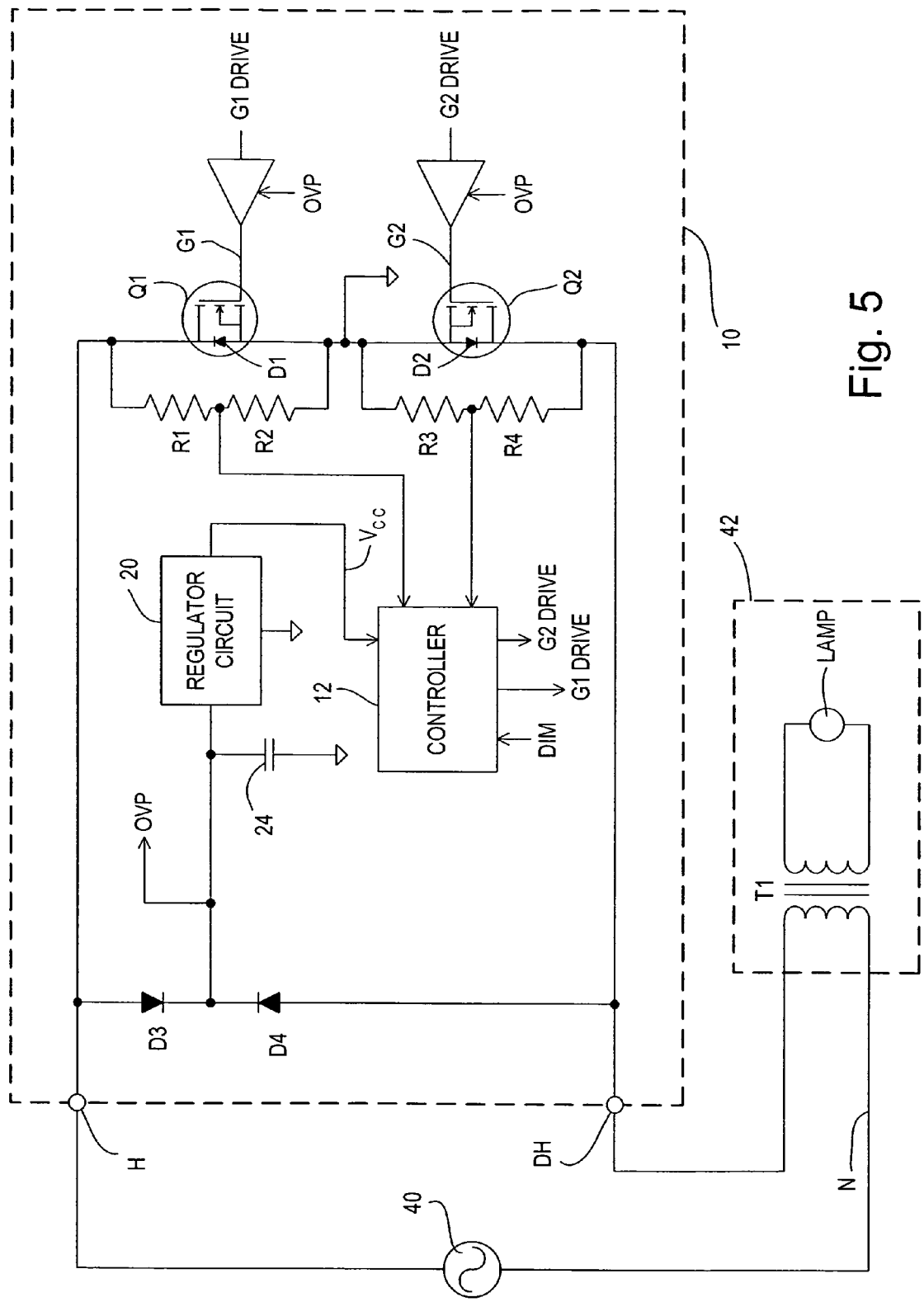
FIG. 5 shows an open-loop embodiment of the circuit of FIG. 1.

In the first embodiment shown in FIG. 1, the circuit operates in closed-loop fashion such that the non-failing transistor is turned off only as needed to recharge the storage capacitor 24, as shown in FIGS. 3(*a*) and 3(*b*). According to another embodiment of the present invention, the microprocessor controller 12 need not monitor the voltage across capacitor 24. In the simplified open-loop circuit shown in FIG. 5, the controller 12 will periodically turn on the non-faulty switch Q1 or Q2 to enable the capacitor 24 to charge to a level sufficient to continue to provide adequate voltage to the controller 12. A worst-case charging time, $t_{wwc}$, is determined during which the controller 12 will periodically turn off the non-failing transistor after a time interval to ensure that the controller is adequately powered by the power supply. This time interval will be some integral multiple of the AC line period minus the time period $t_{wwc}$ necessary to charge the storage capacitor. Accordingly, this time interval, t, can be expressed as $$t = nT - t_{wwc}, \qquad \text{(Equation 1)}$$

where n is an integer, T is the AC line period and $t_{wwc}$ is the worst-case charging time $t_w$. For example, in the waveform shown in FIG. 6(*a*), open-loop control is used with the integer n equal to 3 and the time period $t_{wwc}$ equal to 1 millisecond. With a 50 Hz line frequency, $t = nT - t_{wwc} = 59$ milliseconds.

In a further embodiment, the circuit of the invention is synchronized with the AC line so that the brief periods of non-conduction, $t_w$, i.e., the brief periods when the non-failing transistor is turned off, do not occur during portions of the half-cycle when adequate charging of storage capacitor 24 cannot occur. For example, if the periods of non-conduction $t_w$ occur at the very beginning of a half-cycle, when the AC line voltage has not risen appreciably, inadequate charging of the capacitor may occur during the brief period of non-conduction if it occurs then. It is therefore desirable to synchronize the periods of non-conduction so that they occur when the AC line voltage has risen to a sufficient level to cause adequate charging of the storage capacitor. In order to accomplish this, a timer can be employed to synchronize the charging times with the AC line peaks to enable sufficient charging to occur during the periods of non-conduction. This will be explained later with reference to FIG. 12.

Should the failing switch fail in the open condition, the type of open condition failure will determine the appropriate response. Should the failing FET fail open such that both the source-drain path as well as the body diode/external diode are open, no voltage will reach the load and therefore there is no danger of an overheating condition. However, should the failing transistor fail such that only the source drain path is open, that is, the gate of the FET, for example, blows, leaving the diode intact, then an asymmetry in the voltage supplied to the load will result. In such case, the non-failing transistor will conduct during the appropriate half-cycle and the body diode or external diode of the failing transistor will carry the load current in this half-cycle. However, in the other half-cycle, the failing switch will not conduct because the source-drain path is open and the body diode or external diode is reversed biased. Accordingly, no current will pass in this half-cycle, resulting in a DC level being passed to the load. In such an instance, it is not possible to substantially equalize the half-cycles and the controller 12 (which will be supplied with adequate power as a half-cycle is absent) will switch off the non-failing FET or both FETs.

Figure 7A:
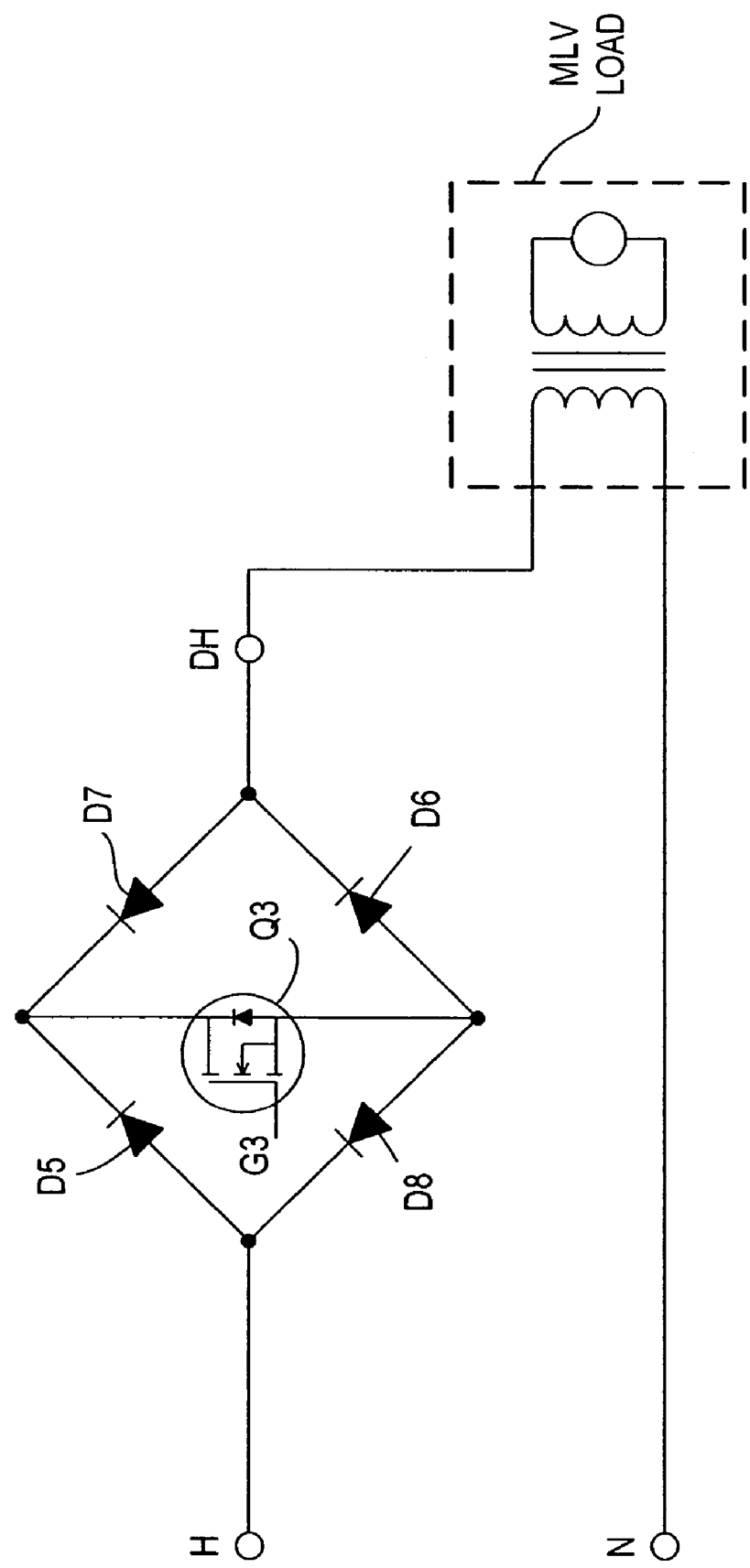
FIG. 7A shows a different form of bidirectional switch which can be used in the circuit of the present invention.

FIG. 7A shows a single FET Q3 contained within a bridge rectifier comprising diodes D5, D6, D7, D8. The bridge rectifier ensures that current always flows in the same direction through the FET Q3 when the FET is conducting, thus allowing the single FET Q3 contained in the bridge to replace both FETs Q1, Q2 shown in the circuit of FIG. 1. The circuit of FIG. 7A is thus a bidirectional switch. However, the circuit of FIG. 1 is not needed to protect against the FET failure if the circuit of FIG. 7A is substituted for the two switches of FIG. 1. Should the single FET Q3 fail shorted, both half-cycles will be delivered to the load equally and there is no risk of a DC voltage being delivered to the load. Should the FET fail open, such that both the gate and the body diode are open, no power will be delivered to the load at all. Should the FET fail open such that the body diode is still intact, again no power will be delivered to the load because the body diode is always reverse biased. Accordingly, the circuit of FIG. 1 is not necessary to protect against FET failure alone.

However, the circuit of FIG. 1 is useful to protect against failure of one or multiple ones of the diodes D5, D6, D7, D8 of the bridge of FIG. 7A. For example, if both forward conducting diodes D5 and D6 fail shorted, during the positive half-cycle, when the switch Q3 is conducting, the positive half-cycle will be provided to the load. During the negative half-cycle, since the conducting diodes D5 and D6 are shorted, the negative half-cycle will be provided to the load through the shorted diodes and the body diode of the switch. Since there is no control of the switch during the negative half-cycle because the body diode is forward biased, the full negative half-cycle will be delivered to the load, again resulting in asymmetry and thus a DC component delivered to the load. Accordingly, the circuit of FIG. 1 can be used to protect the load in this instance and to ensure that adequate power is provided to the power supply. If the bidirectional switch circuit of FIG. 7A were incorporated in the circuit of FIG. 1, a voltage divider would be coupled across each of the diodes to sense if the diodes were shorted.

Figure 7B:
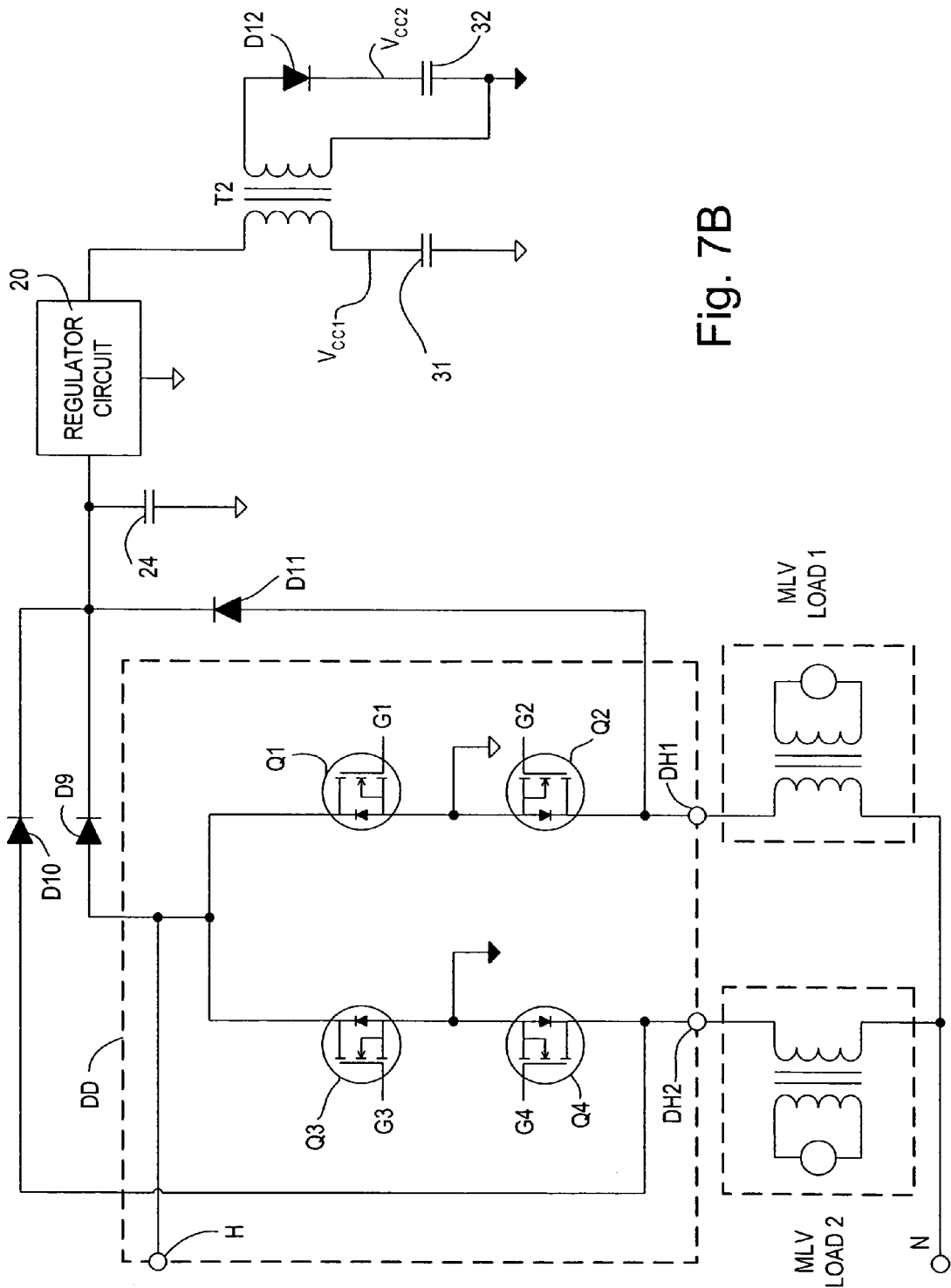
FIG. 7B shows a dual dimmer circuit according to another aspect of the present invention.

FIG. 7B shows another circuit according to the present invention comprising a dual dimmer circuit DD, each dimmer comprising two anti-series connected FET switches coupled to a respective MLV load. A plurality of diodes D9, D10 and D11 are connected between the hot terminal H and dimmed hot terminals DH1 and DH2 to the input supply capacitor 24 of the regulator circuit 20. In this circuit, should only one of the switches fail shorted, the other dimmer leg will continue to supply power to the power supply so it is not necessary to turn off the non-failing switch in the leg with the failing switch for the brief period of time $t_w$ to provide power to the power supply. However, it is still necessary in order to prevent saturation of the transformer core of the supply transformer for the lamps powered by the leg including the failing switch to turn the non-failing switch into full conduction to prevent overheating. Accordingly, the circuit of FIG. 1 could still be employed to sense that the switch has failed and to turn the non-failing switch on into full conduction during the half-cycle that the switch can control, but it would not be necessary to turn off the non-failing switch briefly during this half-cycle for the time $t_w$ in the leg containing the failing switch to provide adequate power to the control circuit.

Should there be multiple FET failures, i.e., one shorted switch in each leg, then it would be necessary to briefly turn off the non-failing switches when they are turned on fully to provide adequate power to the power supply. Accordingly, depending on the level of protection desired, it may be beneficial to incorporate the brief turn-off feature of the circuit of FIG. 1 into the circuit of FIG. 7B.

Also shown in FIG. 7B is the power supply for the gates of the FETs. Since the two dimmer circuits must have isolated grounds, the output of the regulator circuit 20 is coupled to isolation transformer T2. A DC voltage $V_{CC1}$ is produced across capacitor 31 to supply power to the driver circuit to drive gates G1 and G2. A DC voltage $V_{CC2}$ is produced across capacitor 32 to provide power for gates G3 and G4 via diode D12.

Figure 8:
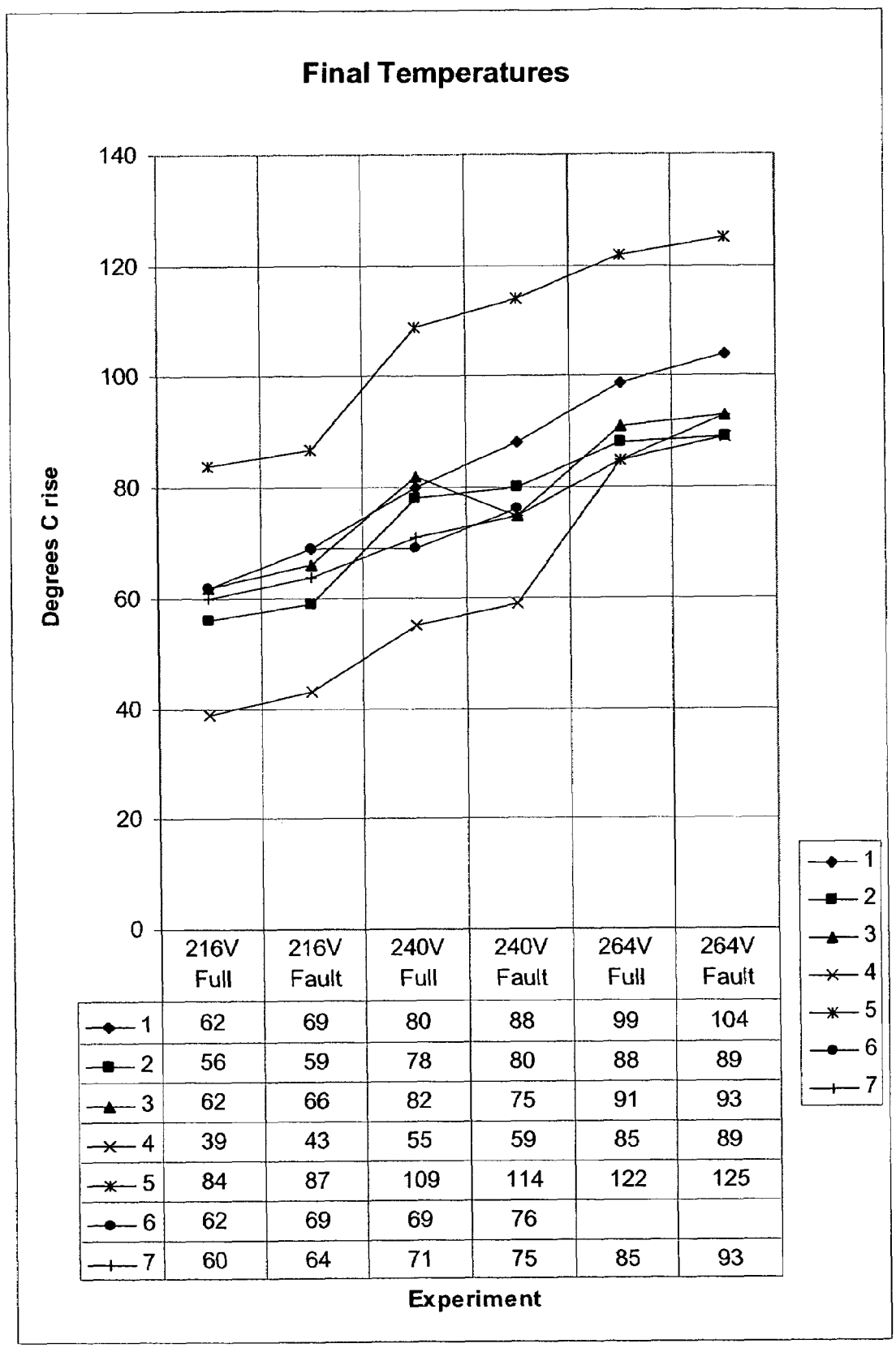
FIG. 8 shows temperature measurements for seven different transformer loads for a range of three different RMS voltages during normal and fault conditions.

In experiments conducted to compare the operation of the circuit of the present invention under normal and fault conditions (one FET shorted), the temperatures were recorded for various MLV transformers connected to the dimmer under both conditions. FIG. 8 shows the results of the tests. MLV transformers from seven different manufacturers were tested as represented by the seven different traces on the graph of FIG. 8. The tests were run for a nominal 240 volt RMS AC input voltage, for a low RMS AC input voltage of 216 volts, and a high RMS AC input voltage of 264 volts, both in an operational (full conduction) and in a fault mode (one of the switches is shorted). As shown, the difference in temperature of a normal operating transformer and a transformer with the connected dimmer in a fault condition is no more than about 8° C. In one case for transformer 3 tested at 240 volts, an aberration was noted, in that the measured temperature during the fault condition was lower.

FIGS. 9–12 show flowcharts for the software or logic implemented by the controller according to the present invention.

Figure 9:
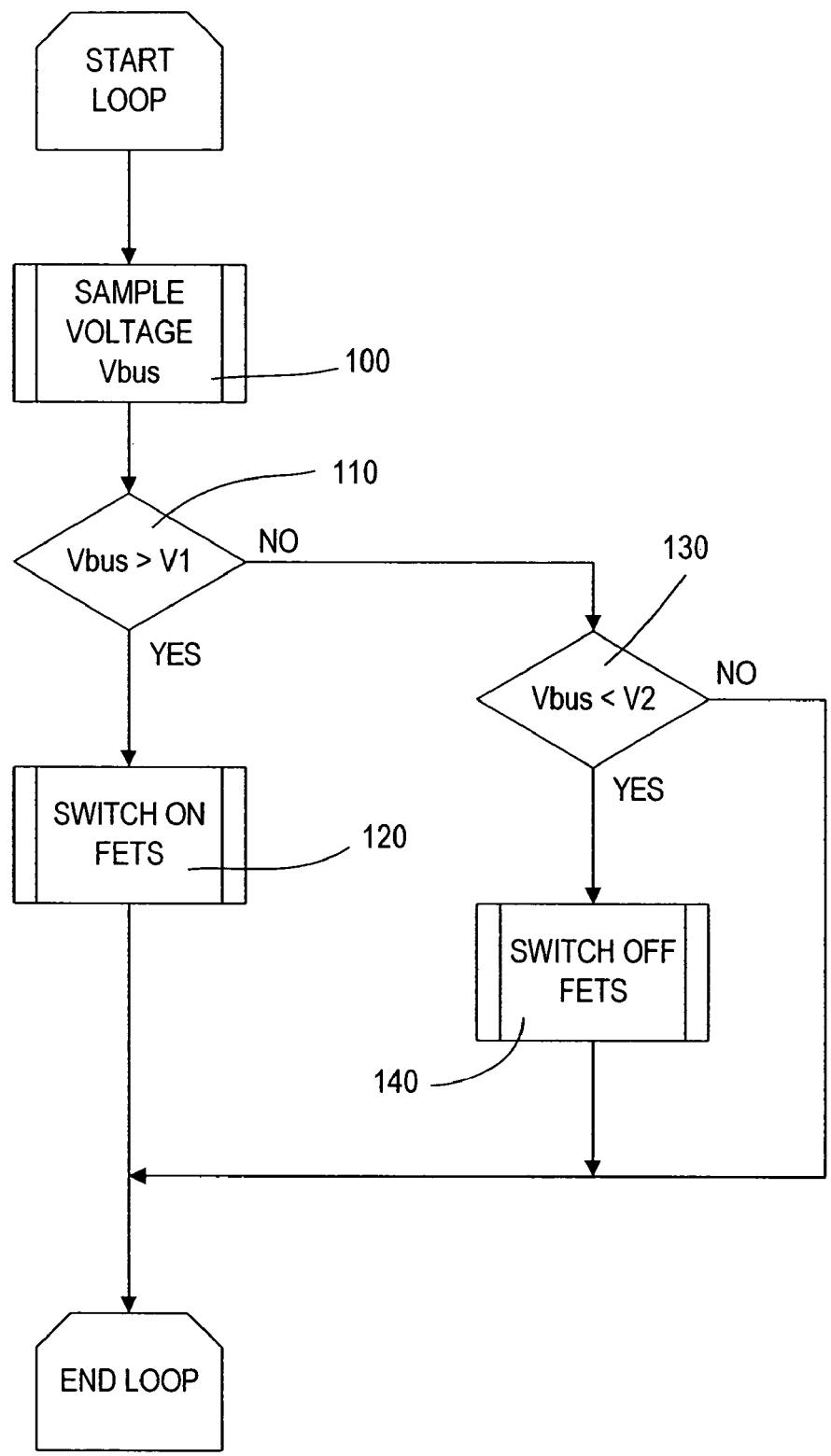
FIG. 9 shows a flowchart for software implemented by the controller, e.g., a microprocessor, for a basic closed-loop system according to the present invention.

FIG. 9 shows one embodiment of software implemented by the microprocessor controller 12 for a basic closed-loop system after a shorted FET fault condition is detected. Once the fault is detected, the software remains in this loop, monitoring the voltage of storage capacitor 24 and switching the FETs on or off accordingly. First, the voltage across capacitor 24 is sampled at 100. If the voltage if greater than $V_1$ (the upper voltage threshold from FIG. 3) at 110, the FETs are switched on to full conduction at 120. If the voltage is not greater than $V_1$, a check is made to determine if the voltage is less than $V_2$ (the lower voltage threshold from FIG. 3) at 130. If the voltage across capacitor 24 is not less than $V_2$, the state of the FETs is not changed. If the voltage is less than V$_2$, meaning it is not within the range between V1 and V2, the FETs are switched off at 140 to allow the capacitor to charge. The flow then ends. Note that this process periodically runs in a main loop.

As described above, in an open-loop system, the voltage across capacitor 24 would be sampled at a periodic rate determined as the worse case charging rate i.e., ensuring that the voltage on the storage capacitor will never go below the voltage V$_2$.

Figure 10:
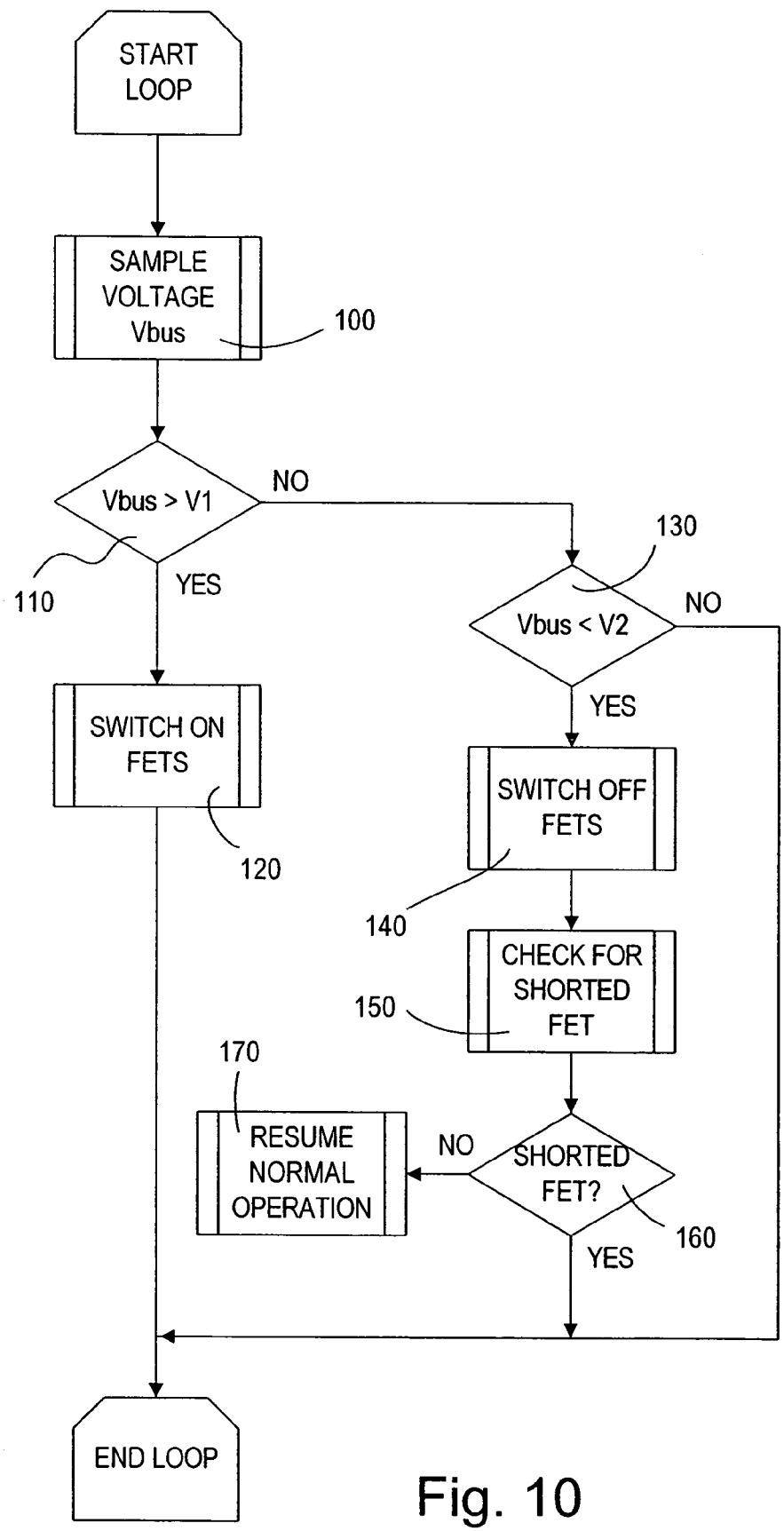
FIG. 10 shows a flowchart for a basic closed-loop system with a recovery feature.

FIG. 10 shows a flowchart for a basic closed-loop system with a recovery feature. First, the voltage across the storage capacitor 24 is sampled at 100 and a check is made at 110 to determine if the voltage on the storage capacitor is greater than V$_1$. If it is, the FETs are switched on at 220, and if not, a check is made at 130 to determine if the voltage on the storage capacitor 24 is less than V$_2$. If the voltage is less than V$_2$, the FETs are switched off at 140. A check is then made at 150 to determine if the FET is shorted by checking the voltage across the resistor dividers R1, R2 and R3, R4. If a FET is shorted as determined at 160, the state of the FETS is not changed. If the FET is determined not to be shorted at 170, normal operation is resumed and an exit is made from the loop. The loop will be entered periodically as determined by the processor flow.

As indicated, whenever the FETs are switched off at 140, a check is made to determine if there is a shorted FET. Thus the logic checks for the fault to be present whenever it switches the FETs off. If FETs are switched off falsely, the software or logic can recover and return to normal operation.

Figure 11:
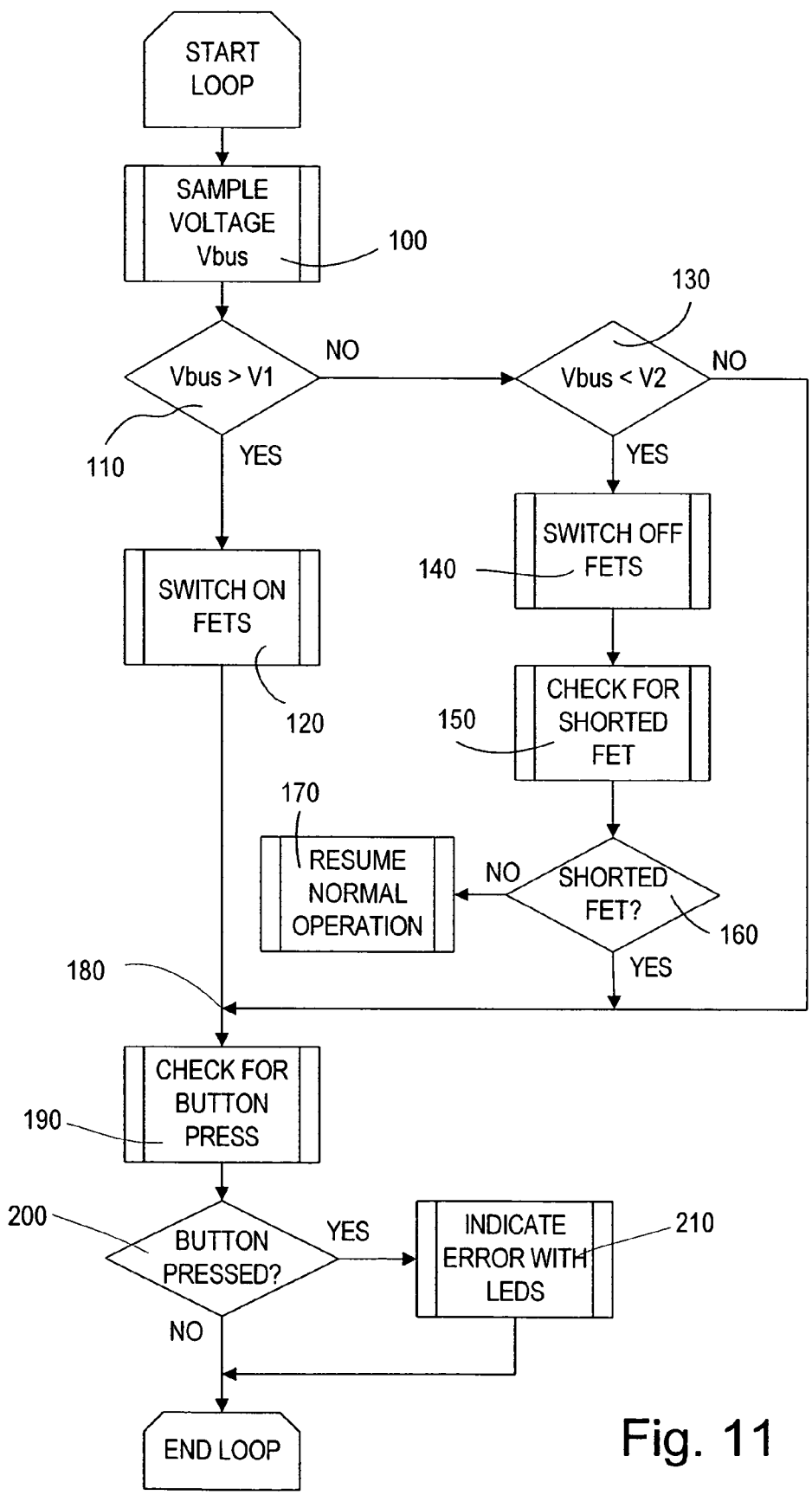
FIG. 11 shows the flowchart for a basic closed-loop system with recovery feature and fault indication.

FIG. 11 shows a flowchart for a basic closed-loop system with the recovery feature (of the flowchart of FIG. 10) and fault indication. Like steps will be provided with like reference numerals and will not be described further herein. When the flow reaches point 180, a check is made at 190 for a button press on the user interface of the dimmer. Thus, if any actuator or button on the dimmer user interface is actuated at 200, the software will provide diagnostic feedback to the user by flashing LEDs on the dimmer or otherwise providing an error display at 210. If no button is depressed at 200, no LED feedback is provided.

Figure 12:
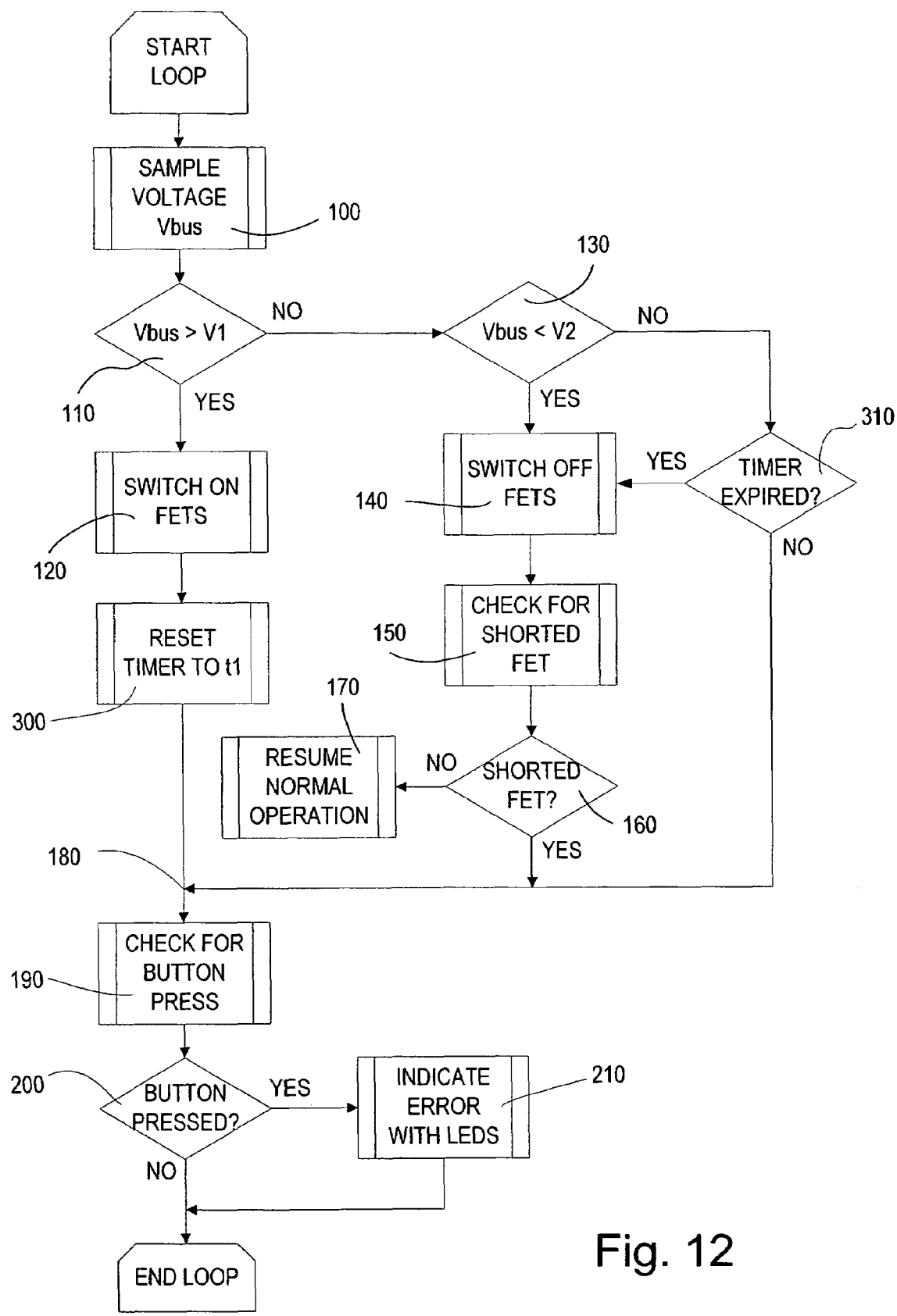
FIG. 12 shows the flowchart for an advanced closed-loop system with recovery feature and fault indication.

FIG. 12 shows a flow chart for an advanced closed-loop system with the recovery feature and fault indication. As indicated in FIG. 12, the capacitor voltage is first sampled at 100 and a check is made at 110 to determine if the voltage across the storage capacitor is greater than V$_1$. If it is, the FETs are switched on at 120 and a timer is set to time t1 at 300. The flow then proceeds to check for a button actuation 190 as described with reference to FIG. 11 to determine if an error should be indicated at 210. If the voltage across the storage capacitor 42 is not greater than the upper level V$_1$, then the flow moves to 130 and a check is made to determine if the voltage is less than the lower limit V$_2$. If the voltage is not lower, meaning the voltage is between V$_1$ and V$_2$, a check is made to determine if the timer previously set has expired, as indicated at 310. If the timer has expired, the FETs are switched off. If the timer has not expired, a return is made to point 180. The timer is used to synchronize the charging point of the capacitor with the peak of the line to optimize the charging process. Note that the time t1 of the timer is equal to $$t1 = nT - t_{wwc},\qquad\text{(Equation 1)}$$

where n is an integer, T is the period of an AC line cycle, and t$_{wwc}$ is the worst-case charging time at the peak of the AC line. The lower voltage threshold V$_2$ is set such that the time t1 will expire before the threshold is reached.

Figure 6:
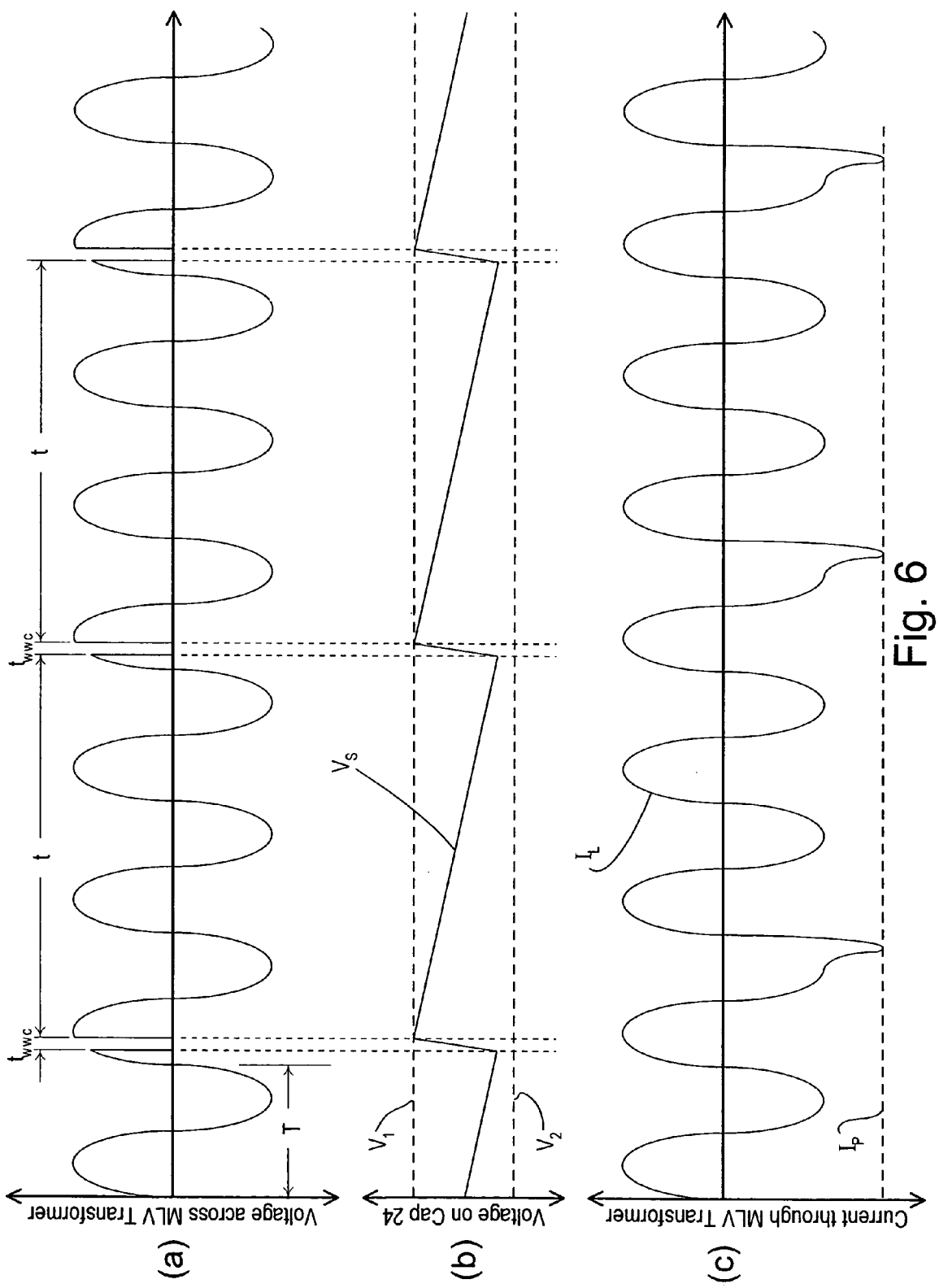
FIG. 6 shows waveforms in the circuit of FIG. 5 of the present invention.

Thus, in the embodiment shown in FIG. 12, both the storage capacitor voltage and timer are monitored. The timer operates such that the FETs are only switched off after they have been switched on and such that the time nT−t$_{wwc}$ elapses before the FETs can be switched off. This ensures that the FETs can only be switched off when there is adequate charging voltage for the storage capacitor as shown in FIG. 6(*a*). Further, the lower voltage threshold, as explained above, is set such that the timer will always expire before the threshold is reached. Thus, in this embodiment, although the voltage across the capacitor is monitored to determine when to switch on the FETs and reset the timer, the FETs can only be switched off when the timer has expired, which will ensure that this only occurs near the peak of the AC line waveform. Should an aberrant situation occur where the capacitor voltage falls below V$_2$ before the timer has expired, the switches will be switched off in accordance with the flow shown in FIG. 12 even though the timer has not expired.

Also, although only the non-failing switch needs to be provided with gate control signals to switch it off, the gate control signals can be provided by the controller 12 to the gates of both the failing and non-failing switch. The failing switch simply will not respond.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A dimmer circuit for providing AC power from an AC voltage source to an inductive lighting load disposed in series with the dimmer circuit comprising:
   a bidirectional semiconductor switch having at least one control electrode provided with a control signal for controlling the amount of power provided to the load, the switch in normal operation being able to be controlled to block voltage in first and second opposite polarity half-cycles of the AC voltage source but in a failure mode being able to block the AC voltage source in only one half-cycle of the AC voltage source and not being able to block the AC voltage source in the second opposite polarity half-cycle;
   a controller for the switch for determining if said failure mode of the switch occurs;
   a power supply coupled across said dimmer circuit for supplying power to the controller;
   the controller controlling the switch if such failure mode occurs so as to:
   drive the switch into substantially full conduction during most of the half-cycle which the switch is able to control; and
   drive the switch into non-conduction for a brief interval of time during that same half-cycle so as to prevent a DC voltage component supplied to the load from exceeding a predetermined level below which excessive transformer heating does not occur, thereby minimizing overheating of the inductive load and enabling the power supply for the controller to be provided with sufficient voltage from the AC voltage source to enable the controller to continue to operate.

2. The circuit of claim 1, further wherein, when a failure mode is detected by the controller, the controller periodically drives the switch into non-conduction for the brief interval of time.

3. The circuit of claim 1, wherein, when a failure mode is detected by the controller, the controller periodically drives the switch into non-conduction for the brief interval of time after an integral multiple of the line period of the AC voltage source.

4. The circuit of claim 1, further comprising a power supply monitor circuit for monitoring a power supply voltage, wherein if the power supply voltage falls below a predetermined lower level, said controller drives said switch into non-conduction for the brief interval of time, thereby enabling the power supply to be provided with sufficient voltage from the AC voltage source to enable the controller to continue to operate.

5. The circuit of claim 4, wherein the brief interval of time begins at a zero-crossing of the AC voltage source.

6. The circuit of claim 4, wherein the brief interval of time ends at a zero-crossing of the AC voltage source.

7. The circuit of claim 4, wherein the power supply monitor circuit monitors a power supply voltage across a storage capacitor of the power supply.

8. The circuit of claim 7, wherein the storage capacitor is disposed at an input of said power supply and provided with voltage from said AC voltage source via a rectifier.

9. The circuit of claim 8, wherein the circuit comprises a two-wire dimmer circuit which is in series with the hot side of said AC voltage source and said load and is only connected to the AC neutral side of said AC voltage source through the load.

10. The circuit of claim 4, wherein the power supply monitor circuit comprises a voltage divider circuit disposed across said storage capacitor.

11. The circuit of claim 1, wherein said power supply comprises a switching mode power supply.

12. The circuit of claim 8, wherein said rectifier comprises first and second diodes coupled to first and second terminals of said dimmer circuit and having a common connection coupled to said storage capacitor.

13. The circuit of claim 1, further comprising a switch monitor circuit coupled to said switch for monitoring said switch to determine if said failure mode has occurred.

14. The circuit of claim 13, wherein said switch monitor circuit comprises a voltage divider circuit coupled to said switch.

15. The circuit of claim 1, wherein said bidirectional switch comprises first and second FETs connected in an anti-series circuit, so that said FETs have one corresponding main current carrying terminal connected in common, each FET being able to block voltage in a respective half-cycle of the AC source voltage in the absence of the failure mode.

16. The circuit of claim 15, further comprising a switch monitor circuit connected to each of said FETs for detecting the failure mode and having an output coupled to said controller.

17. The circuit of claim 16, wherein the switch monitor circuit connected to each of said FETs comprises a voltage divider circuit connected across the main current carrying terminals of each FET.

18. The circuit of claim 15, wherein each FET has an intrinsic diode or external diode that is connected in parallel with the main current carrying terminals of the FET and that is reverse biased when the FET is able to block voltage during normal FET operation in the absence of said failure mode.

19. The circuit of claim 4, wherein when the power supply monitor circuit determines that the power supply voltage has exceeded a predetermined upper level, said controller drives said switch back into full conduction.

20. The circuit of claim 19, further wherein said controller checks periodically to determine if the detected failure mode in said switch is due to an actual failure in said switch or if said switch is being controlled by another circuit so as to appear to be a failure in said switch when in fact the switch has not failed.

21. The circuit of claim 20, wherein if the controller determines that the detected failure is not an actual failure, the controller resumes normal operation of said dimmer circuit thereby allowing dimming.

22. The circuit of claim 1, further comprising at least one control actuator allowing manual control of said dimmer circuit, and further wherein the controller determines if the at least one control actuator has been actuated and in response, displays an error indication on a display device if the failure mode has been detected.

23. The circuit of claim 19, further comprising a timer that is reset when said switch is driven on by said controller, said timer expiring after a preset time, further wherein the controller monitors said timer to determine if said preset time has expired and wherein the controller drives said switch off when said timer has expired, thereby synchronizing the brief interval of time for providing power to the power supply with peaks of said AC source voltage.

24. The circuit of claim 23, wherein said timer preset time is set to expire prior to said power supply voltage falling below said predetermined lower level.

25. The circuit of claim 1, wherein the bidirectional switch comprises at least one FET disposed in a rectifier bridge such that a predetermined polarity of current always passes through the at least one FET in one direction.

26. The circuit of claim 1, further comprising a second dimmer circuit providing power to a second inductive lighting load, each of said dimmer circuits being in series with a respective lighting load and wherein each dimmer circuit has a dimmer output and a common input, a rectifier being coupled between the common input and a power supply input, a respective rectifier being coupled between each dimmer output and said power supply input.

27. The circuit of claim 26, wherein said power supply comprises first and second outputs for providing power to the control terminals of each bidirectional switch of each dimmer circuit.

28. A method for operating a dimmer circuit for providing AC power from an AC voltage source to an inductive lighting load disposed in series with the dimmer circuit, wherein the dimmer circuit comprises a bidirectional semiconductor switch having at least one control electrode provided with a control signal for controlling the amount of power provided to the load, the switch in normal operation being able to be controlled to block voltage in first and second opposite polarity half-cycles of the AC voltage source but in a failure mode being able to block the AC voltage source in only one half-cycle of the AC voltage source and not being able to block the AC voltage source in the second opposite polarity half-cycle; a power supply coupled across the dimmer circuit for supplying power to a control circuit for the dimmer circuit;

the method comprising:
  determining if said failure mode of the switch occurs which can cause an asymmetry between the half-cycles delivered to the load and thus a DC voltage component to be delivered to the load;
  driving the switch into substantially full conduction during most of the half-cycle which the switch is able to control; and driving the switch into non-conduction for a brief interval of time during that same half-cycle so as to prevent a DC voltage component supplied to the load from exceeding a predetermined level below which excessive transformer heating does not occur, thereby minimizing overheating of the inductive load and enabling the power supply for the control circuit to be provided with sufficient voltage from the AC voltage source to enable the control circuit to continue to operate.

29. The method of claim 28, further comprising periodically driving the switch into non-conduction for the brief interval of time when a failure mode is detected.

30. The method of claim 28, further comprising periodically driving the switch into non-conduction for the brief interval of time after an integral multiple of the line period of the AC voltage source when a failure mode is detected.

31. The method of claim 28, further comprising monitoring a power supply voltage, and if the power supply voltage falls below a predetermined lower level, driving said switch into non-conduction for the brief interval of time, thereby enabling the power supply to be provided with sufficient voltage from the AC voltage source to enable the controller to continue to operate.

32. The method of claim 31, further comprising monitoring a power supply voltage across a storage capacitor of the power supply.

33. The method of claim 32, wherein the dimmer circuit comprises a two-wire dimmer circuit which is in series with the hot side of said AC voltage source and said load and is only connected to the AC neutral side of said AC voltage source through the load.

34. The method of claim 28, further comprising monitoring said switch to determine if said failure mode has occurred.

35. The method of claim 28, wherein said bidirectional switch comprises first and second FETs connected in an anti-series circuit, so that said FETs have one corresponding main current carrying terminal connected in common, each FET being able to block voltage in a respective half-cycle of the AC source voltage in the absence of the failure mode.

36. The method of claim 35, wherein each FET has an intrinsic diode or external diode that is connected in parallel with the main current carrying terminals of the FET and that is reverse biased when the FET is able to block voltage during normal FET operation in the absence of said failure mode.

37. The method of claim 31, further comprising when the power supply monitor circuit determines that the power supply voltage has exceeded a predetermined upper level, driving said switch back into full conduction.

38. The method of claim 37, further comprising checking periodically to determine if the detected failure mode in said switch is due to an actual failure in said switch or if said switch is being controlled by another circuit so as to appear to be a failure in said switch when in fact the switch has not failed.

39. The method of claim 38, further comprising resuming normal operation of said dimmer circuit thereby allowing dimming if the detected failure is not an actual failure.

40. The method of claim 28, further wherein the dimmer circuit comprises at least one control actuator allowing manual control of said dimmer circuit, and further comprising determining if the at least one control actuator has been actuated and in response, displaying an error indication on a display device if the failure mode has been detected.

41. The method of claim 37, further comprising resetting a timer when said switch is driven on, said timer expiring after a preset time, further comprising monitoring said timer to determine if said preset time has expired and driving said switch off when said timer has expired, thereby synchronizing the brief interval of time for providing power to the power supply with peaks of said AC source voltage.

42. The method of claim 41, wherein said timer preset time is set to expire prior to said power supply voltage falling below said predetermined lower level.

43. The method of claim 28, wherein the bidirectional switch comprises at least one FET disposed in a rectifier bridge such that a predetermined polarity of current always passes through the at least one FET in one direction.

* * * * *